United States Patent
Yabushita et al.

(10) Patent No.: US 8,043,740 B2
(45) Date of Patent: Oct. 25, 2011

(54) FLAT-SHAPED BATTERY

(75) Inventors: Noriyuki Yabushita, Ibaraki (JP); Koji Yamaguchi, Ibaraki (JP); Toshikazu Yoshiba, Ibaraki (JP)

(73) Assignee: Hitachi Maxell Energy, Ltd., Kyoto (JP)

( * ) Notice: Subject to any disclaimer, the term of this patent is extended or adjusted under 35 U.S.C. 154(b) by 815 days.

(21) Appl. No.: 12/050,613

(22) Filed: Mar. 18, 2008

(65) Prior Publication Data

US 2008/0241669 A1 Oct. 2, 2008

(30) Foreign Application Priority Data

Mar. 19, 2007 (JP) .................. 2007-070446

(51) Int. Cl.
*H01M 2/02* (2006.01)
*G01M 17/02* (2006.01)
*B60C 23/00* (2006.01)

(52) U.S. Cl. ........... 429/162; 429/176; 73/146; 340/442

(58) Field of Classification Search .................. 429/162, 429/175–177; 73/146; 340/442

See application file for complete search history.

(56) References Cited

FOREIGN PATENT DOCUMENTS

| JP | 61-133571 A | 6/1986 |
|---|---|---|
| JP | 63-6984 B2 | 2/1988 |
| JP | 63-175345 A | 7/1988 |
| JP | 64-35871 A | 2/1989 |
| JP | 3-22346 A | 1/1991 |
| JP | 6-7493 B2 | 1/1994 |
| JP | 2003-200723 A | 7/2003 |
| JP | 2004-311117 A | 11/2004 |
| JP | 2004-342422 A | 12/2004 |
| JP | 2005-347154 A | 12/2005 |

*Primary Examiner* — Gregg Cantelmo
(74) *Attorney, Agent, or Firm* — Birch, Stewart, Kolasch & Birch, LLP

(57) ABSTRACT

The flat-shaped battery includes an electrode material containing an active material, and a battery case which has the electrode material housed inside and in which a plurality of protruding members extending inwardly from an inner surface of the battery case are fixed to the inner surface. The electrode material is housed in the battery case with those individual protruding members inserted in the electrode material. As a result, even if the flat-shaped battery is subjected to such external influences as accelerations and vibrations, the electrode material can securely be prevented from moving within the battery case.

12 Claims, 10 Drawing Sheets

FLAT-SHAPED BATTERY

BACKGROUND OF THE INVENTION

1. Field of the Invention

The present invention relates to a flat-shaped battery such as button type batteries and coin type batteries.

2. Description of Related Art

Flat-shaped batteries are used as power sources for various small-sized devices. For example, as shown in Patent Documents 1-5, the flat-shaped battery is so constructed that while a positive material and a negative material, which are electrode materials, are opposed to each other with a separator interposed therebetween, the electrode materials are housed in a battery case having a positive case and a negative case. The positive material is made by, for example, pressure forming of a positive mixture containing powdery manganese dioxide or the like. Therefore, the positive material has a characteristic of being relatively brittle, so that it is difficult to fix the positive material to the inner surface of the positive case of the battery case with the use of electroconductive adhesive or the like. Accordingly, the positive material is housed in the battery case as it is placed on the inner surface of the positive case.

Such a conventional flat-shaped battery is so devised that contactability between the positive material and the inner surface of the battery case is enhanced to thereby suppress deterioration in discharge performance. For instance, in the flat-shaped batteries of Patent Documents 1-5, it is proposed that with a spring or the like placed on the bottom face of the positive case, the positive material is pressed against the negative material side by the biasing force of the spring or the like to ensure the contactability between the positive material and the inner surface of the battery case.

Patent Document 1: JP H3-22346 A (FIG. 1)
Patent Document 2: JP S61-133571 A (FIGS. 1-2)
Patent Document 3: JP S63-175345 A (FIG. 1)
Patent Document 4: JP H6-7493 B (FIG. 3)
Patent Document 5: JP S63-6984 B (FIG. 2)

SUMMARY OF THE INVENTION

In recent years, there are some cases where such flat-shaped batteries are used for wireless tire pressure sensors for detecting air pressure of tires as an example. The tire pressure sensors, being mounted on vehicles' tire wheels or the like, would be subject to influences of accelerations, vibrations and the like in the running of the vehicles.

However, with only such an arrangement that the positive material is pressed against the negative material side by a spring or the like as in conventional flat-shaped batteries, the influences of accelerations or vibrations or the like may cause, in some cases, the positive material to be moved inside the battery case, resulting in a problem that movement of the positive material cannot be securely suppressed. In this case, the positive material would be shifted from the position of proper opposition to the negative material, causing the electric power generation to decline. Further, there is a fear that the positive material may collide with the inner surface of the battery case or a gasket or the like serving for a seal between the positive case and the negative case, resulting in damage of the positive material or the like. Upon such influences by accelerations, vibrations or the like, the positive material within the battery case may be caused to move in various directions, i.e., not only up-and-down movement but also right-and-left movement, rotational movement and the like.

Furthermore, since the tire pressure sensor is subject to influences of heat, the flat-shaped battery may have its battery case expanded by heat. In such a case, the positive material would be more likely to move within the battery case.

Accordingly, an object of the present invention is to provide a flat-shaped battery capable of securely suppressing movement of electrode materials inside the battery case due to vibrations or other external influences.

In order to achieve the above object, the present invention has the following constitutions.

According to a first aspect of the present invention, there is provided a flat-shaped battery comprising:
an electrode material containing an active material; and
a battery case which has the electrode material housed inside and in which a plurality of protruding members extending inwardly from an inner surface of the battery case are fixed to the inner surface, wherein
the electrode material is housed in the battery case with those individual protruding members inserted in the electrode material.

According to a second aspect of the present invention, there is provided the flat-shaped battery as defined in the first aspect, further comprising an elastic member which is placed between a surface of the electrode material into which the protruding members are inserted and the inner surface of the battery case to bias the electrode material toward an inner surface opposite to the inner surface of the battery case.

According to a third aspect of the present invention, there is provided the flat-shaped battery as defined in the second aspect, further comprising a flat plate member fixed to the inner surface of the battery case, wherein
one end portion of the flat plate member is folded so that the protruding member is formed, and
the other end portion of the flat plate member is folded so that the elastic member is formed as a plate spring.

According to a fourth aspect of the present invention, there is provided the flat-shaped battery as defined in the second aspect, wherein
the electrode material has a flat shape and the individual protruding members are inserted into one end face of the electrode material in a thicknesswise direction thereof, and
a protrusion size to which the protruding members protrude inward of the battery case is set to within a range from 1/10 to 2/3 of a thickness of the electrode material.

According to a fifth aspect of the present invention, there is provided the flat-shaped battery as defined in the second aspect, wherein the protruding members and the elastic member are formed from an electroconductive material.

According to a sixth aspect of the present invention, there is provided the flat-shaped battery as defined in the second aspect, wherein the protruding members each have a pointed tip end.

According to a seventh aspect of the present invention, there is provided the flat-shaped battery as defined in the second aspect, wherein
the electrode material includes:
a positive material containing a positive active material;
a negative material containing a negative active material; and
a separator interposed between the positive material and the negative material, and wherein
the battery case includes:
a positive case having an opening to house therein the positive material;
a negative case having an opening to house therein the negative material; and a gasket for providing a seal between the opening of the positive case and the opening of the negative case, wherein the individual protruding members are fixed to a bottom face of the positive case, and the elastic member is placed between the bottom face of the positive case and the positive material to bias the positive material toward the negative material.

According to an eighth aspect of the present invention, there is provided the flat-shaped battery as defined in the seventh aspect, wherein in the bottom face of the positive case, a step portion is formed so that a region of the bottom face inner than an edge portion thereof becomes lower than the edge portion, and the positive material is placed in the region inner than the edge portion while the individual protruding members are fixed in the region inner than the edge portion.

According to a ninth aspect of the present invention, there is provided the flat-shaped battery as defined in the seventh aspect, further comprising:

a ring-shaped member which covers a side face and a bottom-face edge portion of the positive material and which is formed from an electroconductive material higher in rigidity than the positive material, wherein the elastic member is formed from an electroconductive material and biases a bottom face of the ring-shaped member to hold conduction between the positive material and the bottom face of the positive case.

According to a tenth aspect of the present invention, there is provided a flat-shaped battery comprising:

a positive material containing a positive active material;
a negative material containing a negative active material;
a separator interposed between the positive material and the negative material, a positive case having an opening to house therein the positive material;

a negative case having an opening to house therein the negative material;

a gasket for providing a seal between the opening of the positive case and the opening of the negative case; and a positive-material fixing member formed of a flat plate member which is fixed to a bottom face of the positive case to fix a housing position of the positive material housed in the positive case, wherein the positive-material fixing member has a plurality of protruding members formed by folding one end portion of the flat plate member inward of the positive case, and a plate spring formed by folding the other end portion of the flat plate member inward of the positive case, and with the protruding members inserted in the positive material, the positive material is biased toward the negative material by the plate spring so that the housing position of the positive material is fixed.

According to an eleventh aspect of the present invention, there is provided the flat-shaped battery as defined in the tenth aspect, wherein in the bottom face of the positive case, a step portion is formed so that a region of the bottom face inner than an edge portion thereof becomes lower than the edge portion, and the positive material is placed in the region inner than the edge portion while the individual protruding members and the plate spring are placed in the region inner than the edge portion.

According to a twelfth aspect of the present invention, there is provided The flat-shaped battery as defined in the tenth aspect, further comprising:

a ring-shaped member which covers a side face and a bottom-face edge portion of the positive material and which is formed from an electroconductive material higher in rigidity than the positive material, wherein the positive-material fixing member is formed from an electroconductive material, and the plate spring biases a bottom face of the ring-shaped member to hold conduction between the positive material and the bottom face of the positive case.

According to a thirteenth aspect of the present invention, there is provided a tire pressure detection sensor for use in vehicles, including the flat-shaped battery as defined in the tenth aspect as a power supply source for the sensor.

According to the present invention, in the flat-shaped battery, a plurality of protruding members extending inwardly from an inner surface of the battery case are fixed to the inner surface of the battery case, and the electrode material is housed in the battery case with those individual protruding members inserted in the electrode material. Therefore, the electrode material is held by the individual protruding members so as to be fixed to the inner surface of the battery case. Thus, even if the flat-shaped battery is subjected to external influences such as vibrations, the electrode material can securely be prevented from moving. Consequently, the electrode material can be fixed in a proper position within the battery case, so that stable power generation can be fulfilled. Also, the electrode material can securely be prevented from being damaged due to collisions with the other members such as the inner surface of the battery case. Further, even if the battery case is subjected to thermal influences so as to be expanded, the likelihood that the protruding members may separate from the electrode material is reduced to an extent to which the protruding members are inserted in the electrode material. Thus, even if the battery case is expanded, the electrode material can securely be fixed to the inner surface of the battery case by the protruding members.

BRIEF DESCRIPTION OF THE DRAWINGS

These aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
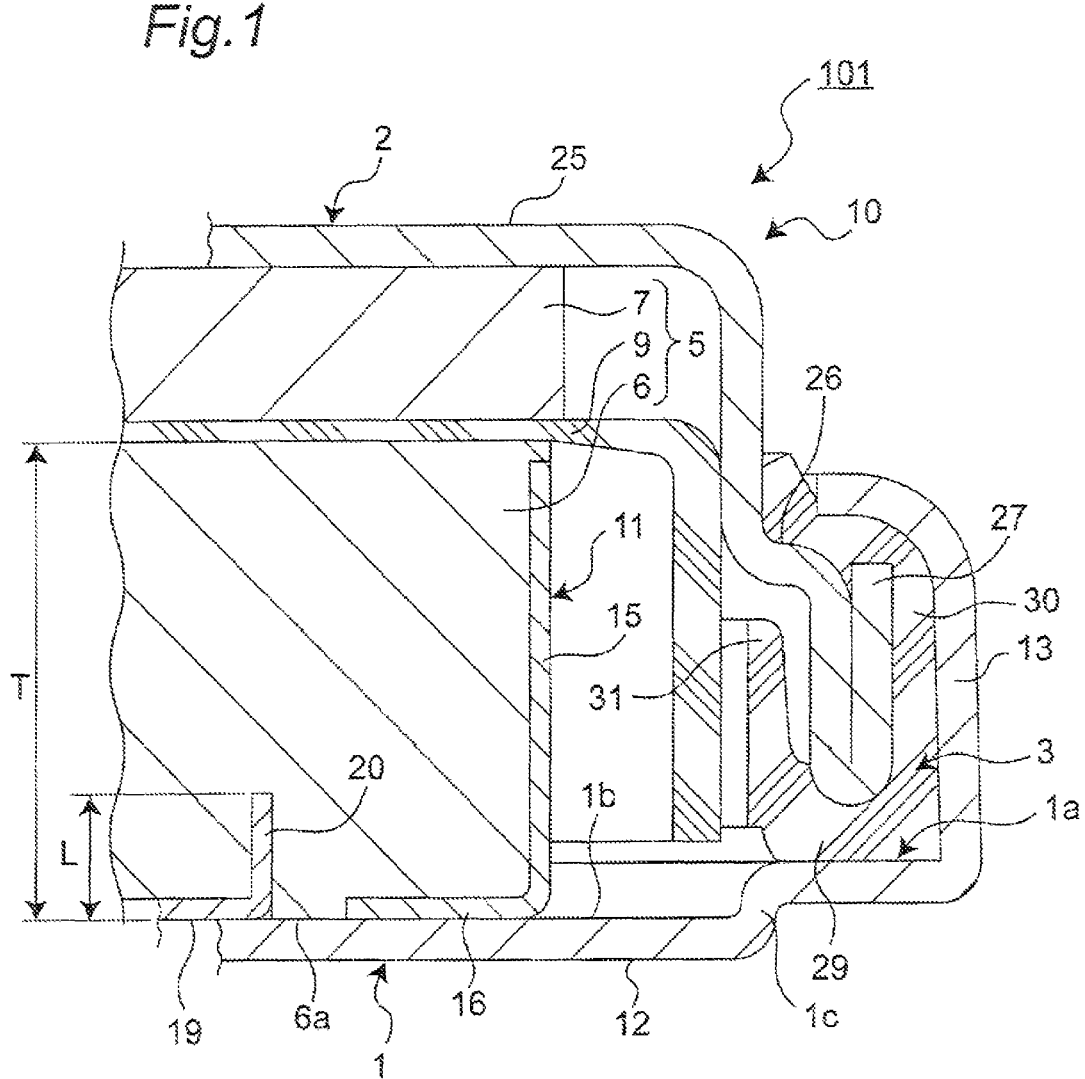
FIG. 1 is a longitudinal sectional view showing main part of a flat-shaped battery according to a first embodiment of the present invention.

Before the description of the present invention proceeds, it is to be noted that like parts are designated by like reference numerals throughout the accompanying drawings.

Hereinbelow, embodiments of the invention will be described in detail with reference to the drawings.

First Embodiment

Figure 2:
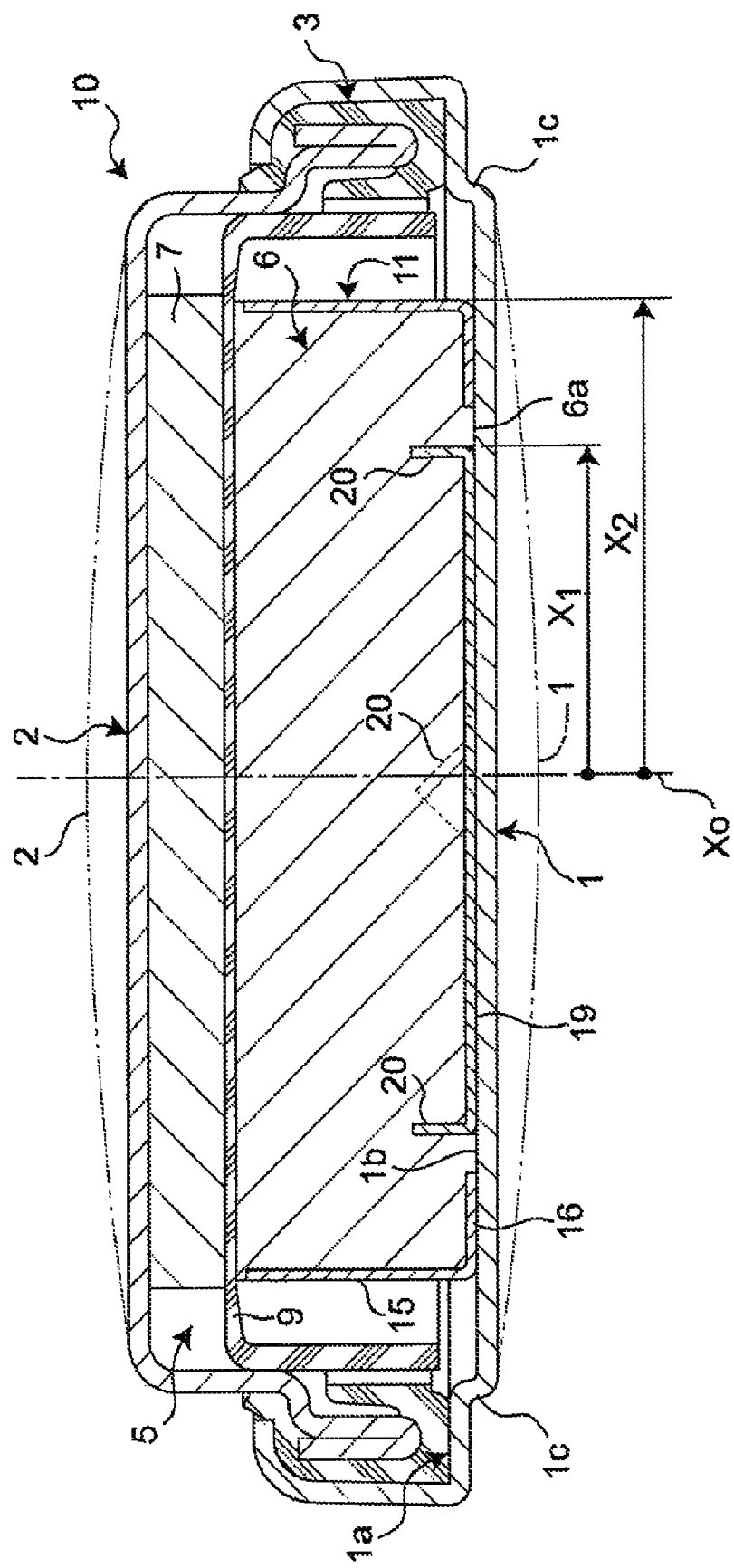
FIG. 2 is a longitudinal sectional view of the whole flat-shaped battery of the first embodiment.

FIGS. 1, 2, 3, 4A and 4B show a first embodiment of a flat-shaped battery to which the present invention is applied. As shown in FIG. 1, the flat-shaped battery 101 of this first embodiment, in which a power generation element 5 and a nonaqueous electrolyte are housed in a battery case 10, is formed into a coin shape which is flat as a whole, as an example. The battery case 10, as shown in FIG. 2, includes a positive case 1 opened upward as viewed in the figure, a negative case 2 opened downward in the figure, and a toroidal gasket 3 placed between peripheral edges of the positive case 1 and the negative case 2 and serving for a seal between the positive case 1 and the negative case 2.

The power generation element 5 has an electrode material containing an active material or the like, and a separator 9 formed of nonwoven fabric or the like. The electrode material is composed of a positive material 6 which contains positive active material and the like and which is formed into a disc shape of a specified thickness, and a negative material 7 which is formed into a disc shape from metallic lithium or lithium alloy that is a negative active material. In the battery case 10, as shown in FIGS. 1 and 2, the negative material 7 is placed on the upper side of the positive material 6 as in the figure with the separator 9 interposed therebetween.

On the positive material 6, as shown in FIG. 2, a positive ring 11 as an example of a ring-shaped member is fitted so as to cover a portion of the outer peripheral side face of the positive material 6 ranging from a side portion containing at least lower side portion as in the figure to an edge portion of an end face 6a on the lower side of the positive material 6 as in the figure. More specifically, the positive ring 11 has a cylindrical portion 15 which is opened above and below and which makes contact with the side face portion of the positive material 6, and an annular flange portion 16 which extends horizontally from the lower end of the cylindrical portion 15 as in the figure toward the central side of the lower face of the positive material 6. By the cylindrical portion 15 being opened at its upper face, the positive material 6 is free to expand upward during discharge. Also, the positive ring 11 is formed from a material, such as stainless steel, having rigidity of a specified level at least higher than the positive material 6 itself and also having electrical conductivity. Since the positive ring 11 is fitted so as to cover the side face of the positive material 6 as shown above, the positive material 6 having a characteristic of being relatively brittle as later described can be prevented from occurrence of cracking or chipping. It is noted that the positive ring 11 may also be formed from ceramics or the like having no electrical conductivity.

In the state that the power generation element 5 and the nonaqueous electrolyte are housed within the battery case 10 and that the gasket 3 is interposed between the positive case 1 and the negative case 2, the negative case 2 is crimped and fixed at an inner edge of the opening of the positive case 1, so that a seal (tight closure) between the positive case 1 and the negative case 2 is implemented by the gasket 3 (a state shown in FIG. 2). It is noted that the gasket 3 is formed of an insulating material, so that the positive case 1 and the negative case 2 are electrically insulated from each other by the gasket 3. The flat-shaped battery 101 has an outer diameter of 24.5 mm and a total thickness of 5.0 mm as an example.

Figure 3:
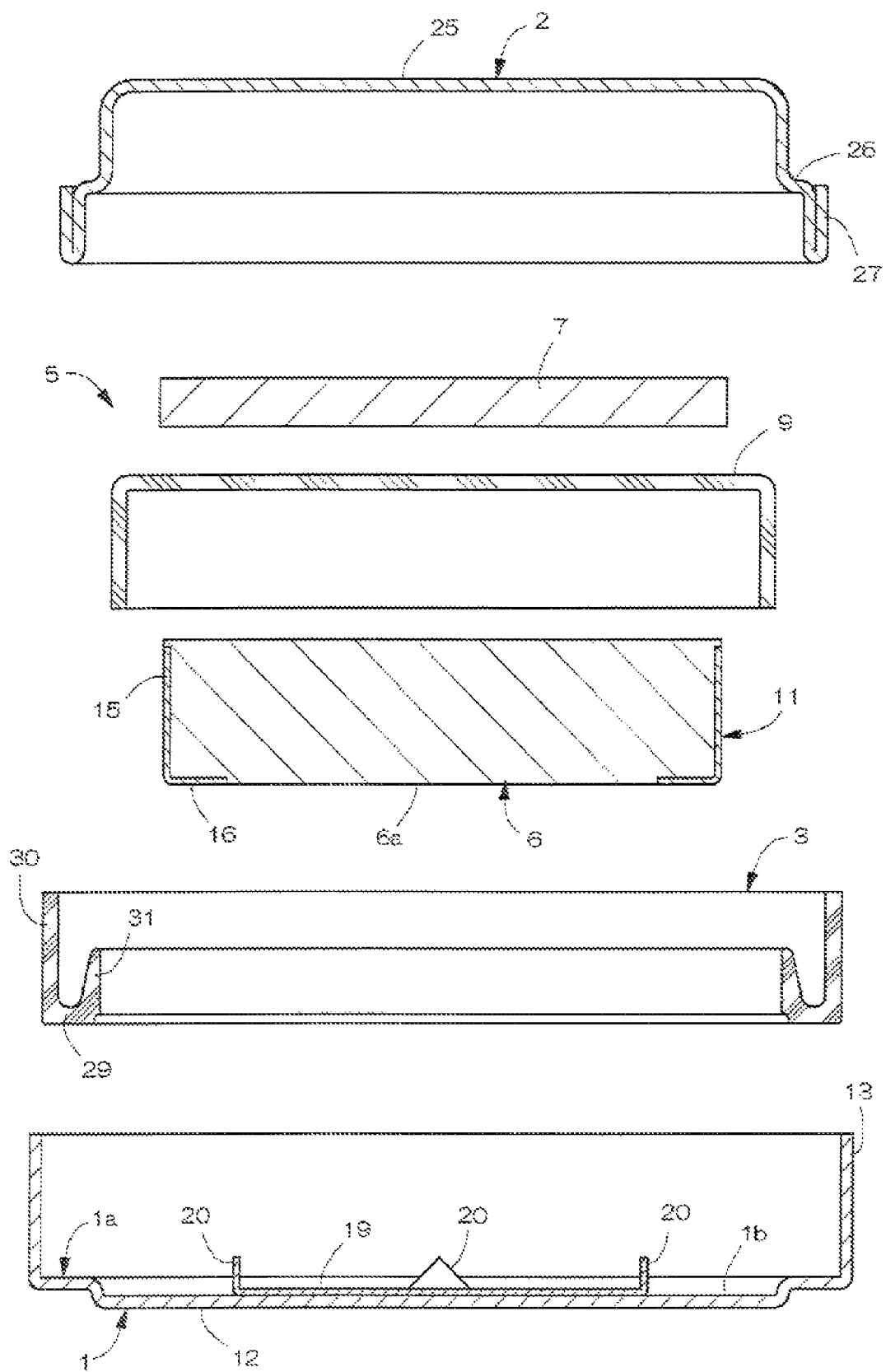
FIG. 3 is an exploded sectional view of the flat-shaped battery of FIG. 2.

The positive case 1 in a blank state before battery assembly, as shown in FIG. 3, is formed as a round dish-shaped press molded article as an example. A peripheral wall 13 is formed so as to extend erect in adjacency to the outer peripheral edge of a bottom wall 12 of the positive case 1. In a bottom face 1a of the positive case 1 on the inner surface side of the bottom wall 12 of the positive case 1, a central portion 1b inner than the edge portion of the bottom face 1a is formed so as to be one-step lower than the edge portion. That is, in the bottom face 1a of the positive case 1, an annular step portion 1c is formed between the edge portion and the central portion 1b. The central portion 1b of the bottom face 1a of the positive case 1 confronts the end face 6a on a thicknesswise one-end side of the positive material 6 (on the lower side in FIG. 3), and the positive material 6 is received together with the positive ring 11 by the central portion 1b of the positive case 1 so as to be set in place (see FIG. 2). It is noted that the central portion 1b of the positive case 1 is a flat surface. In a case where the central portion 1b of the positive case 1 is formed so as to be one-step lower than the edge portion as shown above, it could occur in some cases that the positive material 6 collides with the step portion 1c due to vibrations or the like so as to be damaged, or that the positive material 6 stretches over the step portion 1c so that the separator 9 is excessively strongly sandwiched by the positive material 6 and the negative material 7 so as to be cut off, problematically. However, since any movement of the positive material 6 can be prevented by adopting the constitution of the flat-shaped battery of this first embodiment as described later, such problems as mentioned above can be prevented.

Figure 4A:
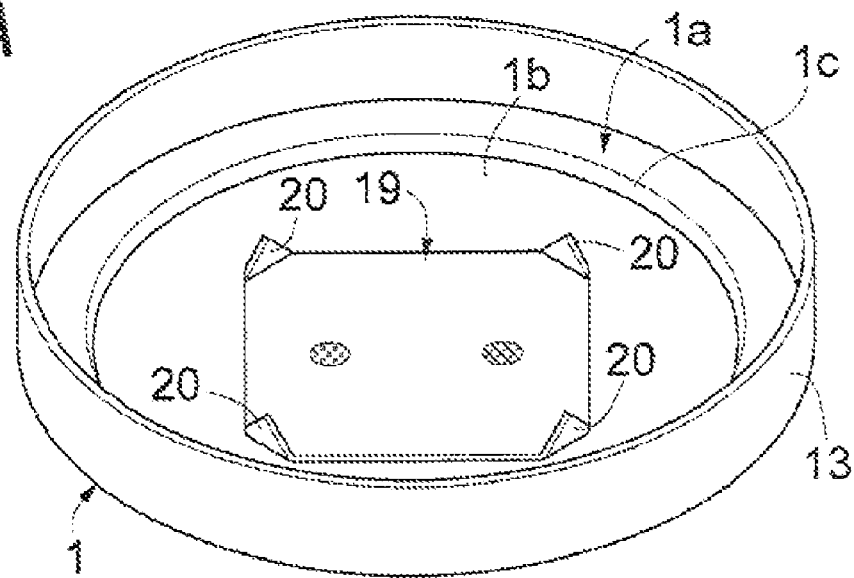
FIG. 4A is a perspective view showing a positive case and a spike member in the flat-shaped battery of the first embodiment.
Figure 4B:
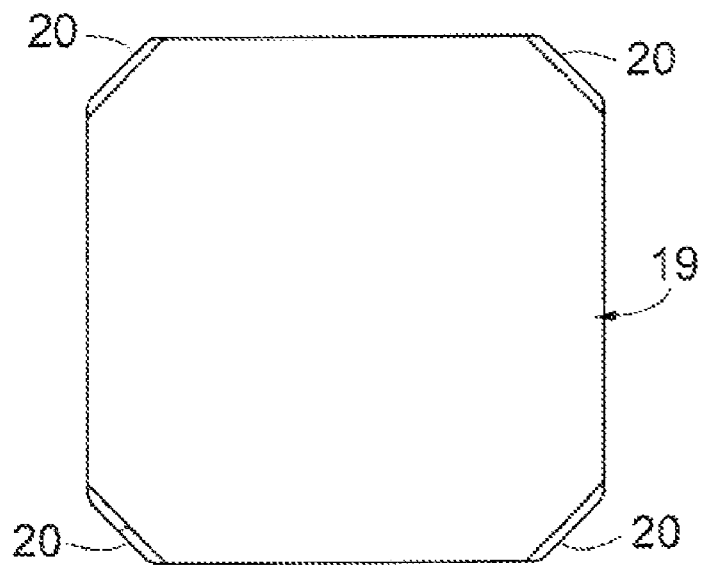
FIG. 4B is a plan view of the spike member of FIG. 4A.

Further, a spike member 19 as an example of a positive-material fixing member formed of electroconductive stainless steel or the like is fixed by spot welding or the like at the central portion 1b of the bottom face 1a of the positive case 1 as shown in FIGS. 3 and 4A. As shown in FIGS. 4A and 4B, the spike member 19 is formed into a flat plate member which is generally rectangular shaped as viewed in a plan view. Four corner portions of the spike member 19 are each folded inward of the battery case 10, by which four protruding members 20 are provided in the central portion 1b of the bottom face 1a of the positive case 1 so as to extend from the central portion 1b inward of the battery case 10 as shown in FIGS. 4A and 4B. That is, triangular protruding members 20 are provided at the corner portions of the spike member 19, respectively. It is noted that the individual protruding members 20 of the spike member 19 are formed so as to be different in angle from one another in a plan view as shown in FIG. 4B.

The protruding members 20 are each formed into a triangular shape with its tip end (upper end portion in FIG. 4A) pointed, as an example, and their height is set to within a range from 0.3 mm to 2.0 mm, more preferably from 0.5 mm to 1.0 mm. As to the relationship between the range of such a height (a size of protrusion inward of the battery case 10) L of the protruding members 20 and a thickness T of the positive material 6 (see FIG. 1), the height L of the protruding members 20 is set to within a range from $1/10$ to $2/3$ of the thickness T of the positive material 6, more preferably from $1/7$ to $1/3$ thereof. Then, the individual protruding members 20 of the spike member 19 stick to the end face 6a of the positive material 6 so as to be inserted from the end face 6a of the positive material 6 into the positive material 6 as shown in FIGS. 1 and 2. By the individual protruding members 20 being inserted into the positive material 6 like this, the positive material 6 is fixed to the central portion 1b of the bottom face 1a of the positive case 1 via the protruding members 20. That is, the position where the positive material 6 is placed on the bottom face 1a of the positive case 1 is fixed by the individual protruding members 20.

When the protrusion size L of the protruding members 20 is larger than ⅔ of the thickness T of the positive material 6, there is a fear that the tip end of each protruding member 20 may stick through the positive material 6 so as to make the separator 9 damaged or that the positive material 6, which is a relatively brittle material, may be cracked by excessive insertion of the protruding members 20. There is a further fear that uniform progress of discharge reaction of the positive material 6 may be inhibited by the individual protruding members 20 excessively inserted into the positive material 6. In order to securely prevent cracking of the positive material 6 as well as to securely realize uniform progress of the discharge reaction, it is more preferable that the protrusion size L of the protruding members 20 is set to ⅓ or less of the thickness T of the positive material 6.

Also in order that the protruding members 20 hold the positive material 6 fixed into the positive case 1 (i.e., prevent the positive material 6 from being positionally shifted) without being disengaged from the positive material 6 even when the flat-shaped battery 101 is subjected to external influences such as vibrations, it is preferable that the protrusion size L of the protruding members 20 is set to ⅒ or more of the thickness T of the positive material 6. Also, when the flat-shaped battery 101 is subjected to thermal influences, the battery case 10 in some cases may expand so as to swell upward and downward, so that the protrusion size L is preferably set to the above-described range from the viewpoint that the insertion state of the protruding members 20 into the positive material 6 is held even in such an expanded state. Further, in order to securely prevent any positional shift of the positive material 6, the protrusion size L is more preferably set to ⅐ or more of the thickness T. It is noted that the spike member 19 may also be formed from an electroconductive material such as aluminum or other metals and resins containing electroconductive carbon. The positive material 6, only if at least partly fixed to the central portion 1b of the bottom face 1a of the positive case 1, has only to partly float to a slight extent from the central portion 1b of the bottom face 1a of the positive case 1.

Given an outer peripheral position $X_2$ of the positive material 6 relative to a center position $X_0$ of the disc-shaped positive material 6 as well as a formation position $X_1$ of the protruding members 20 relative to the center position $X_0$ as shown in FIG. 2, it is preferable that $X_1/X_2$ is set to within a range of 10% to 90%. The setting within such a range makes it possible to prevent the positive material 6 from occurrence of cracking and chipping due to insertion of the protruding members 20 into the positive material 6. Further, by setting $X_1/X_2$ to within a range of 40% to 80%, current collecting action by the spike member 19 formed from an electroconductive material can be fulfilled more successfully.

Figure 5:
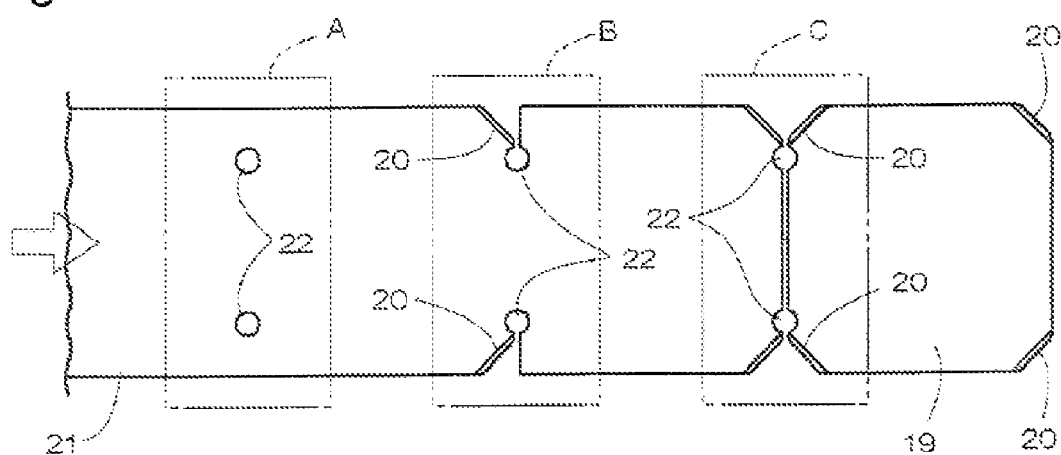
FIG. 5 is a plan view showing a manufacturing process of the spike member of FIG. 4A.

Next, a manufacturing method for the spike member 19 included in the flat-shaped battery 101 of this first embodiment is explained with reference to FIG. 5. The spike member 19, as shown in FIG. 5, is manufactured by using a strip-shaped member 21 formed of stainless steel or the like. The strip-shaped member 21 is formed continuously in its longitudinal direction with a thickness of 0.1 mm and a width of 9 mm as an example.

With use of the strip-shaped member 21 having such a configuration, first in a first press process A, two pilot pin holes 22 are formed at widthwise (up-and-down direction in FIG. 5) both end portions of the strip-shaped member 21. Then, in a second press process B, notches are formed so as to range from widthwise both ends of the strip-shaped member 21 to positions of the pilot pin holes 22, respectively. Thereafter, one end portion of each notch is folded, by which two protruding members 20 are formed on one side (right side in FIG. 5) of the spike member 19.

Subsequently, in a third press process C, the other end portion of each notch is folded, by which two protruding members 20 are formed on the other side (left side in FIG. 5) of the spike member 19. Thereafter, the strip-shaped member 21 is cut so that two pilot pin holes 22 formed side by side in the widthwise direction of the strip-shaped member 21 are connected to each other, and the spike member 19 with the protruding members 20 formed therein are separated from the strip-shaped member 21. As a result, the spike member 19 shown in FIGS. 4A and 4B is fabricated. By such a manufacturing method, the spike member 19 can be manufactured by making the most use of the strip-shaped member 21.

The negative case 2 is formed as a round dish-shaped press molded article as an example. As shown in FIG. 3, the negative case 2 is integrally formed so as to have a housing portion 25 which is provided on the upper wall side of the negative case 2 as viewed in the figure and which serves for housing the negative material, a flange wall 26 which is overhung outward from a lower-end shoulder portion of the housing portion 25, and a seal portion 27 which protrudes downward in adjacency to the flange wall 26 as in the figure. It is noted that the seal portion 27 is formed of a U-turn folded inner-and-outer double wall.

The gasket 3, which is formed as an injection molded article as an example, is formed from a resin composition which is primarily composed of polyphenylene sulfide (PPS) and the like, and which additionally contains an olefin base elastomer and the like. The gasket 3 has a ring-shaped base portion 29, an outer cylindrical wall 30 which overhangs upward from an outer peripheral edge of the base portion 29 and which is placed between the peripheral wall 13 of the positive case 1 and the seal portion 27 of the negative case 2, and an inner cylindrical wall 31 which overhangs upward from an inner peripheral edge of the base portion 29 as in the figure.

The positive material 6 contains powdery manganese dioxide as a positive active material, where powdery graphite, tetrafluoroethylene-hexafluoropropylene copolymer, and hydroxypropyl cellulose are mixed with the manganese dioxide to formulate a positive mixture. With the positive ring 11 set in a specified mold, the positive mixture is filled therein and press-molded into a disc shape, and then the resulting molded product is heated, thus the positive material 6 is formed up.

The separator 9 employs a nonwoven fabric whose raw material is, for example, polybutylene terephthalate fabric, so that the separator 9 is impregnated with a nonaqueous electrolyte. The nonaqueous electrolyte may be a solution resulting from dissolving $LiClO_4$ in a solvent which is a mixture of propylene carbonate and 1,2-dimethoxyethane. It is noted that the separator 9 has a thickness of about 0.3-0.4 mm as an example.

Assembly of the flat-shaped battery 101 is carried out while the individual constituent members shown in FIG. 3 are inverted in posture with upside down from the state of FIG. 3. The positive ring 11 is mounted on the positive material 6 beforehand. Then, the gasket 3 is fitted to an opening end portion of the negative case 2, and the negative material 7 is fixed to the inner surface of the housing portion 25 of the negative case 2 with electroconductive adhesive or the like, after which the separator 9 and the positive material 6 are assembled in superposition on top of the negative material 7. Next, with a nonaqueous electrolyte injected into the negative case 2, the positive case 1 is set over from above so that the negative case 2 and the gasket 3 are fitted into the positive case 1.

Thereafter, the opening end portion of the peripheral wall 13 of the positive case 1 is crimped inward. By this process, the positive case 1 and the negative case 2 are fixedly crimped with the gasket 3 interposed therebetween, thus the assembly of the flat-shaped battery 101 being completed (the state of FIG. 2). In such an assembled state, lower faces of the positive material 6 and the positive ring 11 are in contact with the central portion 1b of the bottom face 1a of the positive case 1, while the positive material 6 is fixed inside the positive case 1 with the protruding members 20 of the spike member 19 inserted in the positive material 6 through the end face 6a of the positive material 6.

When the flat-shaped battery 101 is subjected to thermal influences as an example, there are some cases where gas is generated in the battery case 10 so that the positive case 1 and the negative case 2 are expanded each outward (i.e., an expanded state) by a pressure of the gas (see an imaginary line of FIG. 2). In such an expanded state, the lower faces of the positive material 6 and the positive ring 11 would tend to float and separate from the bottom face 1a of the positive case 1, whereas since the protruding members 20 of the spike member 19 have been inserted into the positive material 6, the protruding members 20 are less likely to separate from the positive material 6 in proportion to the insertion extent. Therefore, even if the positive case 1 is expanded outward, the positive material 6 is securely fixed to the central portion 1b of the bottom face 1a of the positive case 1 by the respective protruding members 20, so that the conducting state between the positive material 6 and the positive case 1 is maintained via the spike member 19 formed of an electroconductive material. In addition to this, because the respective protruding members 20 are maintained inserted within the positive material 6, movement of the positive material 6 particularly in right-and-left directions of FIG. 2 can be suppressed with reliability. Further, because the negative material 7 is fixed to the inner surface of the negative case 2 with electroconductive adhesive or the like, the conducting state between the negative material 7 and the negative case 2 is maintained even if the negative case 2 is expanded outward. Therefore, even in a case where the flat-shaped battery 101, which has been subjected to thermal influences so as to be in an expanded state, is further subjected to external applications of vibrations or the like, the positive material 6 can be held in a securely fixed state by the insertion of the respective protruding members 20, so that the positive material 6 can be prevented from damage or the like.

In the flat-shaped battery 101 of this first embodiment, since the protruding members 20 have electrical conductivity, the protruding members 20 fulfill current collecting action on the positive material 6 so that contact resistance between the positive material 6 and the positive case 1 can be reduced. That is, internal resistance of the battery case 10 can be reduced, by which the discharge characteristic of the battery is improved. Also, even if the battery case 10 is expanded outward due to a gas pressure generated within the battery case 10, the likelihood that the protruding members 20 may separate from the electrode material is reduced to an extent to which the protruding members 20 are inserted in the positive material 6. Thus, the conducting state between the electrode material and the battery case 10 can be maintained with reliability even if the battery case 10 is expanded.

Further, since the positive ring 11 is mounted over a range from the side face portion to the lower-face edge portion of the positive material 6, the positive material 6, when expanded due to discharge or the like, can be made to expand toward the negative material 7 side with reliability by the positive ring 11. Therefore, the state in which the positive material 6 is pressed against the negative material 7 side and, in its reaction, the positive material 6 is pressed against the protruding members 20 so that the protruding members 20 have been inserted in the positive material 6 can be maintained with reliability.

Figure 6:
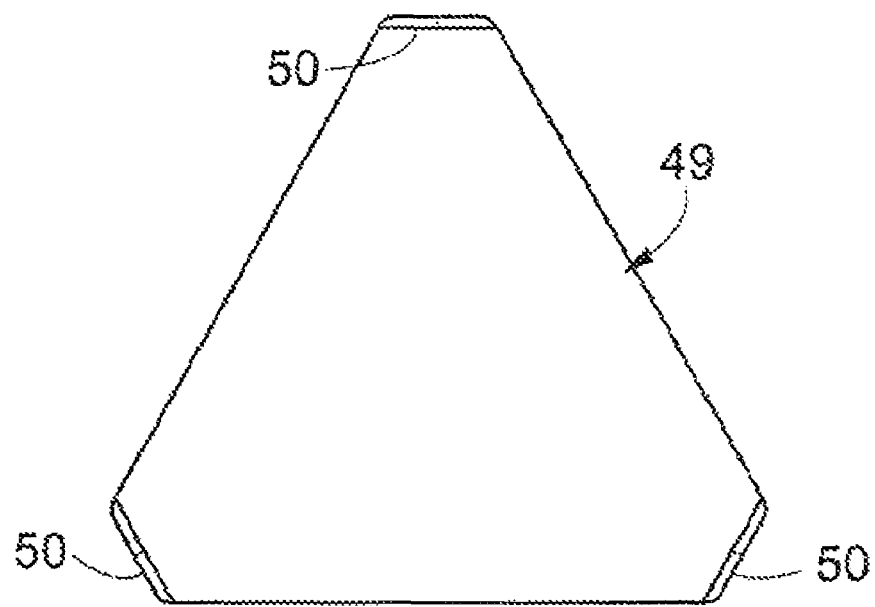
FIG. 6 is a plan view showing a spike member of a flat-shaped battery according to a modification of the first embodiment.

Next, FIG. 6 shows a schematic plan view of a spike member 49 included in a flat-shaped battery according to a modification of the first embodiment. As shown in FIG. 6, the spike member 49 of this modification is formed into a flat plate member which is generally triangular shaped as viewed in a plan view. Three corner portions of the spike member 49 are each folded upward, by which three protruding members 50 are formed. Such a spike member 49 is fixed to the central portion 1b of the bottom face 1a of the positive case 1 by spot welding or the like, and the three protruding members 50 are inserted into the positive material 6, by which the positive material 6 can be fixed. Also, the individual protruding members 60 of the spike member 49 are each formed into a triangular shape with its tip end pointed. It is noted that the rest of the construction is the same as in the flat-shaped battery 101 and so their description is omitted.

In the case of the spike member 49 according to this modification, a triangular spike member 49 can be formed by, for example, cutting the strip-shaped member 21 diagonally to the widthwise direction thereof. That is, the spike member 49 can be manufactured by making the most use of the strip-shaped member 21.

Figure 7:
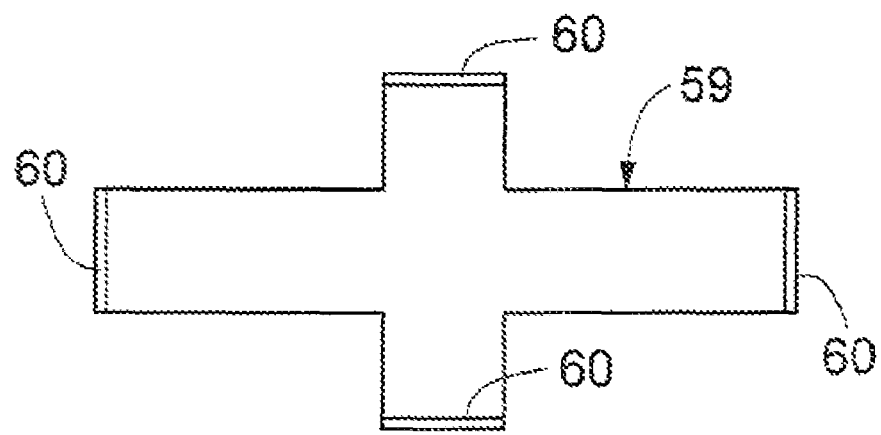
FIG. 7 is a plan view showing a spike member of a flat-shaped battery according to another modification of the first embodiment.

Next, FIG. 7 shows a schematic plan view of a spike member 59 included in a flat-shaped battery according to another modification of the first embodiment. As shown in FIG. 7, the spike member 59 of this another modification is formed into a generally cruciform flat plate shape as viewed in a plan view, and four protruding members 60 are formed by upwardly folding four tip end portions of the spike member 59. Such a spike member 59 is fixed to the central portion 1b of the bottom face 1a of the positive case 1 by spot welding or the like, and the four protruding members 60 are inserted into the positive material 6, by which the positive material 6 can be fixed. The individual protruding members 60 of the spike member 59 of this another modification are each formed into a quadrilateral shape. It is noted that the rest of the construction is the same as in the flat-shaped battery 101 and so their description is omitted.

The individual protruding members 60 of the spike member 59 may also be machined each into a triangular shape whose tip end is pointed, or into a blade shape by cutting the tip end. With such machining applied, the individual protruding members 60 become more easily insertable into the positive material 6.

Moreover, in this first embodiment, the spike member in each of the various modes may be formed into any arbitrary shape only if protruding members can be provided. For instance, shapes other than those of the foregoing spike members 19, 49 and 59, such as a polygonal or other shape, are also adoptable. Further, although the protruding members of the spike member have only to be provided at least one in number, yet the protruding members are preferably provided in a plurality of numbers in order to securely fix the positive material 6 with the protruding members of the spike member.

Second Embodiment

Next, a flat-shaped battery 201 according to a second embodiment of the invention is explained with reference to a longitudinal sectional view shown in FIG. 8. FIG. 9 shows a schematic perspective view of a spike member 70 which is an example of the positive-material fixing member included in the flat-shaped battery 201 of the second embodiment.

In this flat-shaped battery 201 of the second embodiment, the spike member 70 differs in form and function from the spike member 19 of the first embodiment. The rest of the construction is the same as in the flat-shaped battery 101 of the first embodiment, and so like constituent members are designated by like reference numerals and their description is omitted. Those difference points are focused in the following description.

As shown in FIG. 9, the spike member 70 of the second embodiment is formed of a flat plate member having a generally cruciform shape as viewed in a plan view. This spike member 70, for which materials similar to those of the first embodiment are applicable, is formed from a material having electrical conductivity.

The spike member 70 is integrally formed so that a strip-shaped first member 71 and a strip-shaped second member 72 longer than the first member intersect each other to form a cruciform shape. As shown in FIG. 9, the first member 71 is folded upward at its end portions as in the figure, respectively, to form two protruding members 73. These protruding members 73, having the same function as the protruding members 20 of the first embodiment, are inserted inside the positive material 6, thus serving the role for fixing the positive material 6. It is noted that these protruding members 73 are similar in protrusion size, shape and placement to the protruding members 20 of the first embodiment.

Both end portions of the second member 72, which is longer than the first member 71, are folded upward as in the figure at positions short of those end portions by a specified inclination angle θ so as to be in an inclined state. By the end portions of the second member 72 being in such an inclined state as shown above, plate springs 74 as an example of an elastic member are formed at both end portions of the second member 72. The plate springs 74 are each formed elastically deformable so as to exert biasing force (elastic force) upward against external force applied from above as viewed in FIG. 9.

Figure 8:
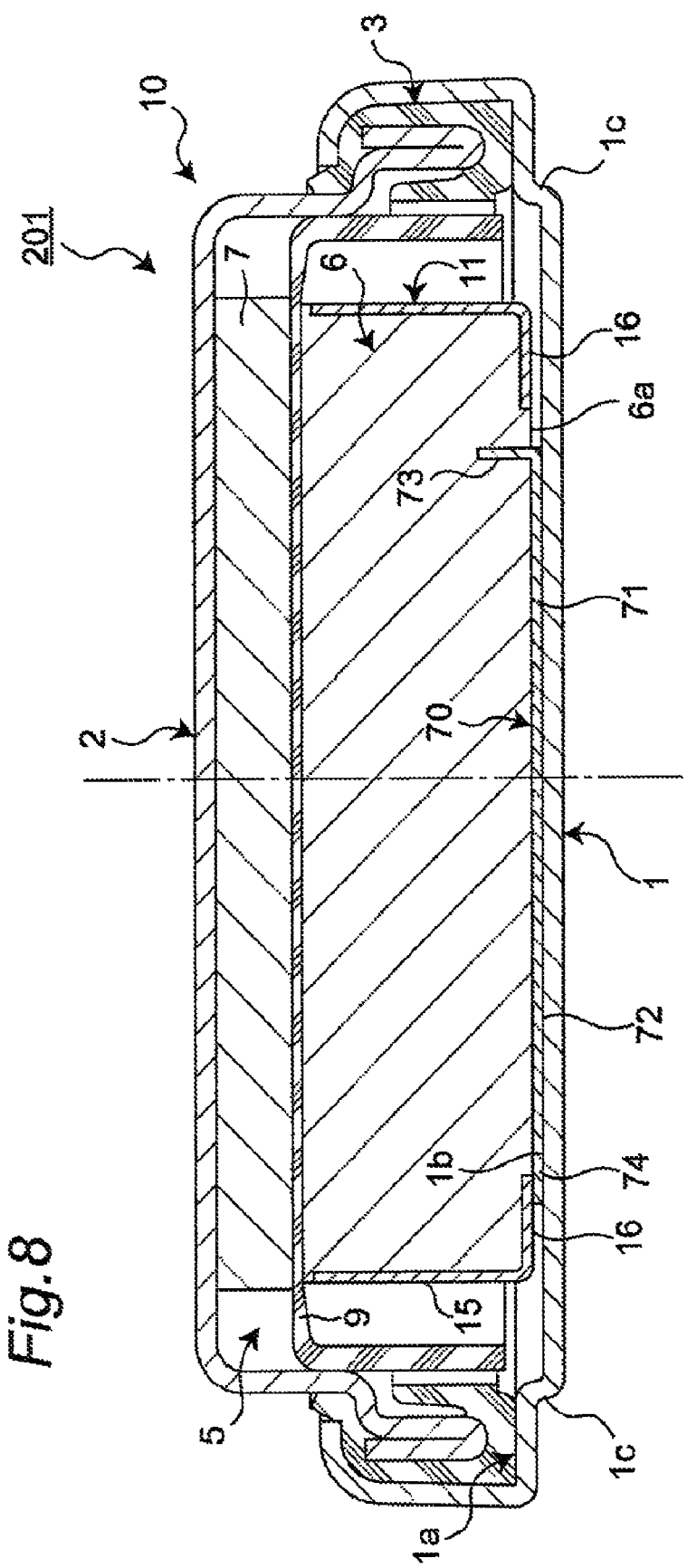
FIG. 8 is a longitudinal sectional view of a flat-shaped battery according to a second embodiment of the invention.
Figure 9:
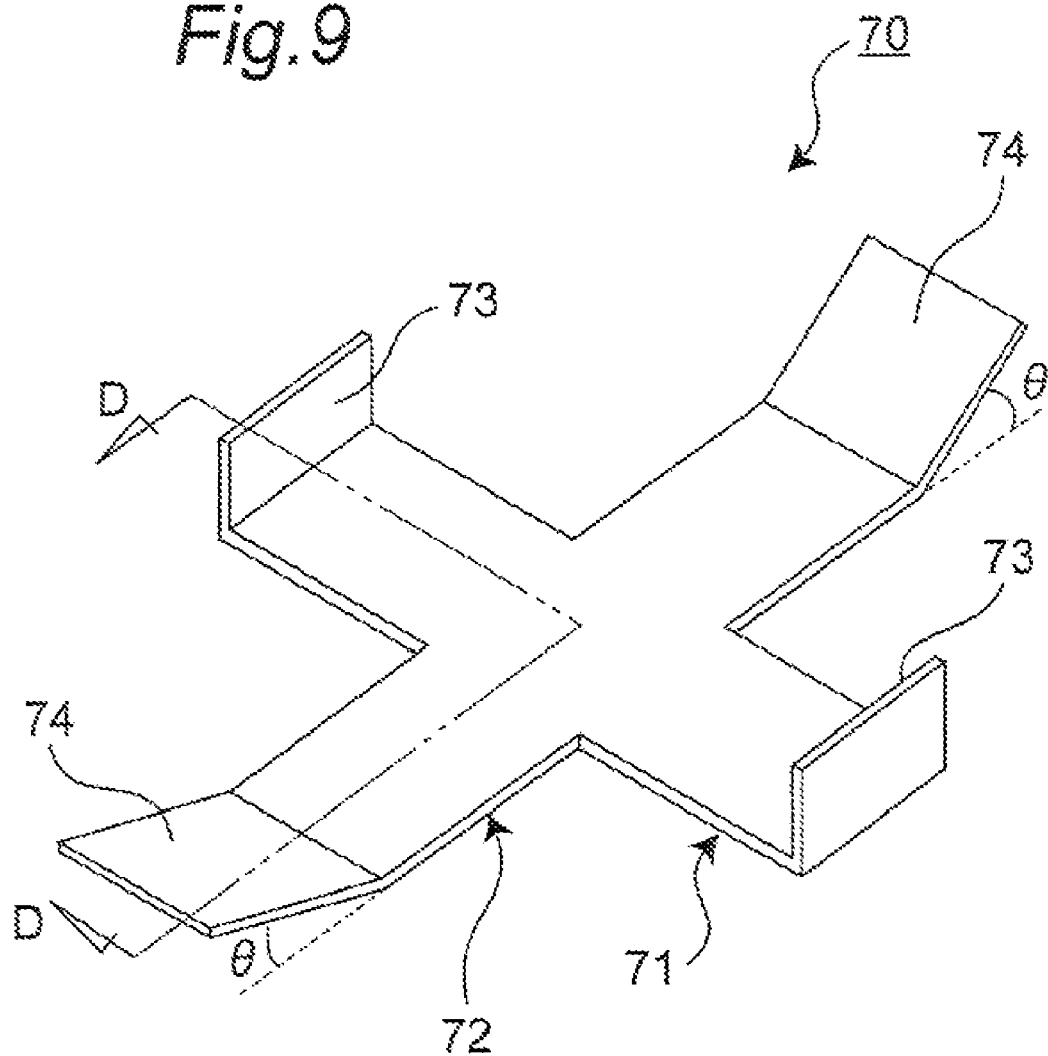
FIG. 9 is a perspective view of a spike member included in the flat-shaped battery of the second embodiment.

Such a spike member 70 having the above-described construction, as shown in FIG. 8, is fixed to the central portion 1b of the bottom face 1a of the positive case 1. It is noted that the longitudinal sectional view of the flat-shaped battery 201 shown in FIG. 8 (and FIG. 10) shows a portion of the spike member 70 of FIG. 9 taken along a cross-sectional line D-D. That is, the left-side portion of the spike member 70 as in FIG. 8 (and FIG. 10) shows a cross section of the second member 72 having the plate springs 74, while its right-side portion shows a cross section of the first member 71 having the protruding members 73.

As shown in FIG. 8, the protruding members 73 of the spike member 70 are inserted in the positive material 6 so that the positive material 6 is fixed so as to be prevented from moving. Further, the tip end of each of the plate springs 74 of the spike member 70 is in contact with the lower face of the flange portion 16 of the positive ring 11 fitted on the side face of the positive material 6 as in the figure and sandwiched against the bottom face 1a of the positive case 1, thus being elastically deformed into a generally flat state.

In such a state, it is maintained within the positive case 1 that the positive material 6 is securely fixed by the insertion of the protruding members 73, while the end portions of the elastically deformed plate springs 74 impart their biasing force to the flange portion 16 so that contact between the plate springs 74 and the flange portion 16 is securely held. Accordingly, even if external influences of vibrations or the like are applied to the flat-shaped battery 201, occurrence of positional shifts of the positive material 6 from its fixation position can securely be prevented, while the conduction between the positive material 6 and the positive case 1 can be maintained via the positive ring 11 and the spike member 70.

Figure 10:
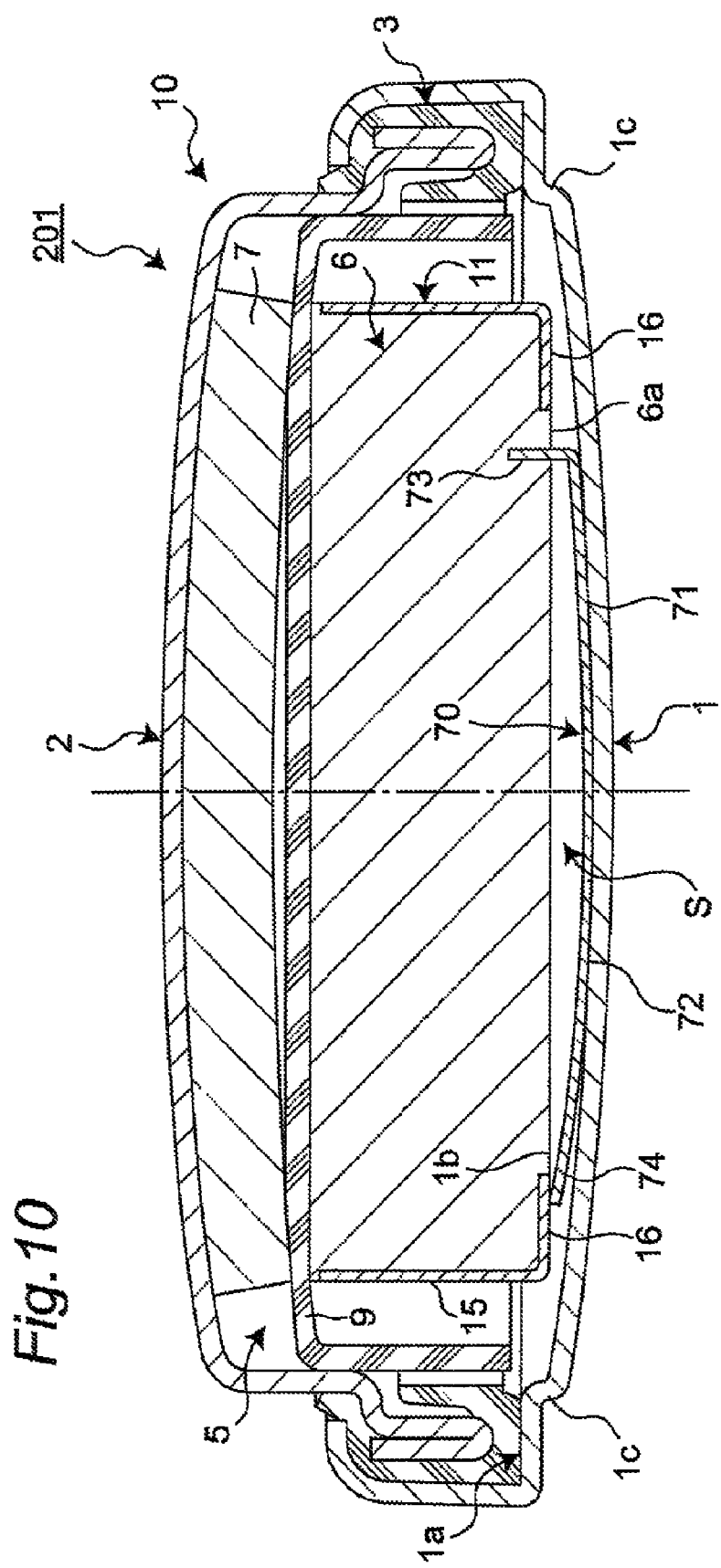
FIG. 10 is a longitudinal sectional view showing an expanded state of the flat-shaped battery of FIG. 8.

Next, FIG. 10 shows a longitudinal sectional view of an expanded state of the flat-shaped battery 201 of this second embodiment. As stated earlier, the longitudinal sectional view of the flat-shaped battery 201 shown in FIG. 10 shows a portion of the spike member 70 of FIG. 9 taken along a cross-sectional line D-D. As shown in FIG. 10, when the flat-shaped battery 201 has come to an expanded state, the positive case 1 and the negative case 2 are deformed so as to be expanded up and down as in the figure. In such an expanded state, a space S is generated between the end face 6a of the positive material 6 and the bottom face 1a of the positive case 1 as shown in FIG. 10.

Even in the case where the space S has been generated like this, the positive material 6 can be pressed toward the negative material 7 side by the biasing force applied to the positive ring 11 by the plate springs 74 of the spike member 70. Accordingly, within the positive case 1, up-and-down movement of the positive material 6 as in the figure can be suppressed, while the conduction between the positive material 6 and the positive case 1 can securely be held via the positive ring 11 and the spike member 70. Also, in such an expanded state, since the protruding members 73 of the spike member 70 are so set in their protrusion size as to be prevented from coming out from the positive material 6, rightward and leftward movement of the positive material 6 as in the figure can securely be suppressed.

Also, since rightward and leftward positional shifts of the positive material 6 as in the figure are securely suppressed as shown above, the placement relationship between the plate springs 74 and the flange portion 16 of the positive ring 11 can be held so that the conduction by their contact can be held. The plate springs 74 and the positive ring 11 are formed from metal material having relatively high electrical conductivity, and therefore the conduction at portions of lower contact resistance can securely be held.

Furthermore, it is also possible to adopt an arrangement that the respective plate springs 74 of the spike member 70 are not in contact with the flange portion 16 of the positive ring 11, but in direct contact with the end face 6a of the positive material 6. However, taking into consideration that the positive material 6 is a relatively brittle material, it is preferable to adopt a mode that the plate springs 74 are brought into contact with the flange portion 16 of the positive ring 11.

As to the plate springs 74 that are formed with an inclination by folding both end portions of the second member 72 at an inclination angle θ, in a state before being assembled into the positive case 1, i.e., in a state of not having been elastically deformed, their inclination angle θ is set to within a range from 2° to 30°, more preferably from 5° to 20°. The height of the plate springs 74 set with such an inclination angle θ is set to within a range from 0.2 mm to 1.5 mm, more preferably from 0.3 mm to 1.0 mm. That is, in the state that the plate springs 74 are not elastically deformed, their height is preferably so set as to be generally equal to or slightly smaller than the protrusion size of the protruding members 73. By setting the height of the plate springs 74 to such ranges as shown above, even if the flat-shaped battery 201 is expanded, the protruding members 73 can be prevented from coming out of the positive material 6, and the positive material 6 can be biased by the elastic force of the plate springs 74, thus making it easier to obtain the above-described effects.

Figure 11:
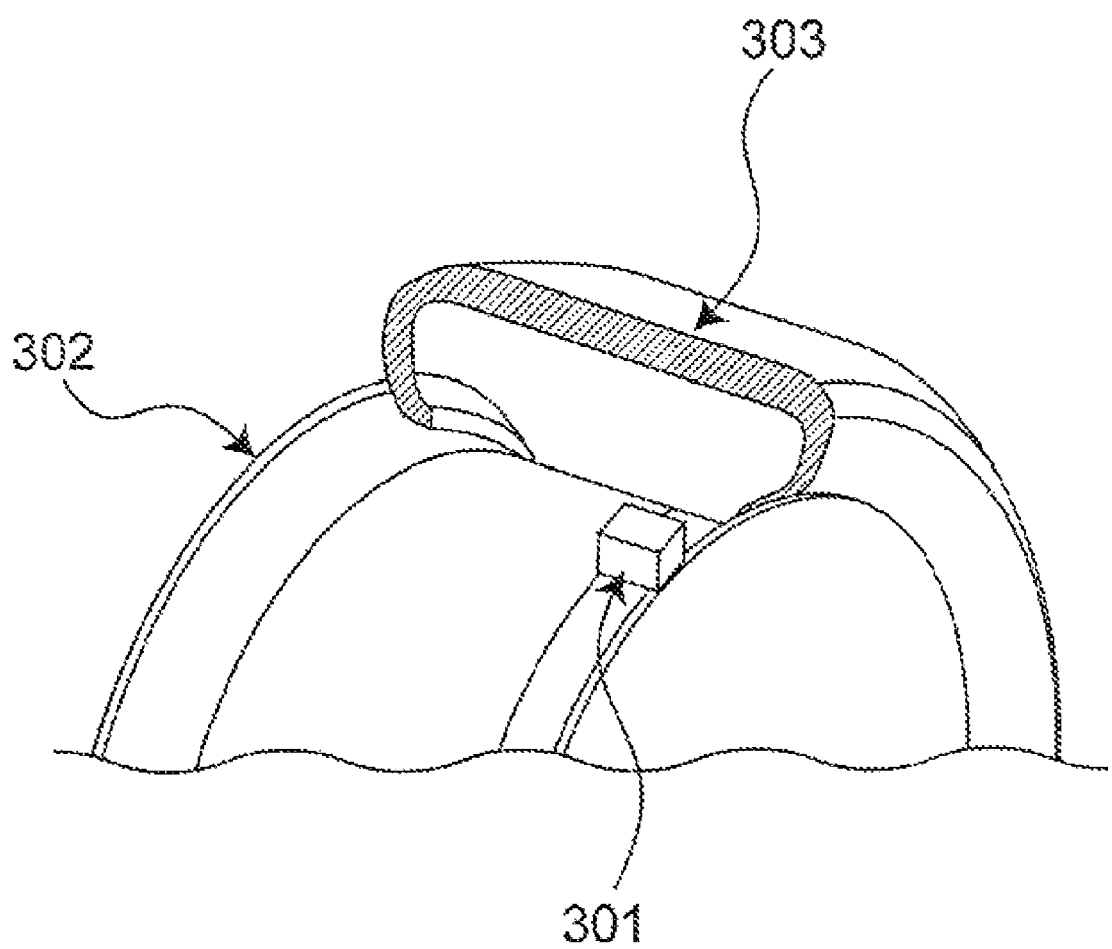
FIG. 11 is a schematic view showing a tire pressure sensor in which the flat-shaped battery of the second embodiment is contained as a power source.

Now, a state in which a vehicle-use tire pressure sensor 301 having the flat-shaped battery 101 or 201 of the foregoing embodiments contained therein as a power source is mounted on a vehicle driving wheel 302 is shown in the schematic view of FIG. 11. The tire pressure sensor 301 is fixed at a peripheral portion of the wheel 302 and enabled to notify the driver of changes in air pressure of the tire 303 by unshown wireless communication means.

Such a tire pressure sensor 301 is subjected to accelerations, vibrations and the like through the rotation drive of the wheel 302 as well as to thermal influences. However, in the flat-shaped batteries 101 and 201, in which the positive material 6 is securely fixed so as to be prevented from positional shifts, the positive material 6 is never damaged so that the flat-shaped batteries 101 and 201 are enabled to fulfill the function as a battery.

Furthermore, the respective flat-shaped batteries of the foregoing embodiments are not limited to applications for tire pressure sensors alone, but applicable as power sources for various devices which may be subject to such external influences as accelerations, vibrations and thermal loads.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Applications No. 2007-070446 filed on Mar. 19, 2007, including specification, drawings and claims are incorporated herein by reference in its entirety.

What is claimed is:

1. A flat-shaped battery comprising:
    an electrode material including a positive material containing a positive active material and a negative material containing a negative active material;
    a battery case including a positive case having an opening to house therein the positive material and a negative case having an opening to house therein the negative material, the positive case being a positive electrode and the negative case being a negative electrode;
    a plurality of protruding members which are fixed to an inner surface of the battery case, the protruding members extending inwardly from the inner surface of the battery case and being inserted in the electrode material housed in the battery case, and
    an elastic member which is placed between a surface of the electrode material into which the protruding members are inserted and the inner surface of the battery case to bias the electrode material toward an inner surface opposite to the inner surface of the battery case, wherein
    the protruding members and the elastic member are integrally formed.

2. The flat-shaped battery as defined in claim 1, further comprising a flat plate member fixed to the inner surface of the battery case the flat plate member having a plurality of end portions, wherein
    one of the end portions of the flat plate member is folded so that the protruding member is formed, and
    the other one of the end portions of the flat plate member is folded so that the elastic member is formed as a plate spring.

3. The flat-shaped battery as defined in claim 1, wherein
    the electrode material has a flat shape and the individual protruding members are inserted into one end face of the electrode material in a thicknesswise direction thereof, and
    a protrusion size to which the protruding members protrude inward of the battery case is set to within a range from 1/10 to 2/3 of a thickness of the electrode material.

4. The flat-shaped battery as defined in claim 1, wherein the protruding members and the elastic member are formed from an electroconductive material.

5. The flat-shaped battery as defined in claim 1, wherein the protruding members each have a pointed tip end.

6. The flat-shaped battery as defined in claim 1, further comprising:
    a separator interposed between the positive material and the negative material, and
    a gasket for providing a seal between the opening of the positive case and the opening of the negative case, wherein
    the individual protruding members are fixed to a bottom face of the positive case, and
    the elastic member is placed between the bottom face of the positive case and the positive material to bias the positive material toward the negative material.

7. The flat-shaped battery as defined in claim 6, wherein
    in the bottom face of the positive case, a step portion is formed so that a region of the bottom face inner than an edge portion thereof becomes lower than the edge portion, and
    the positive material is placed in the region inner than the edge portion while the individual protruding members are fixed in the region inner than the edge portion.

8. The flat-shaped battery as defined in claim 6, further comprising:
    a ring-shaped member which covers a side face and a bottom-face edge portion of the positive material and which is formed from an electroconductive material higher in rigidity than the positive material, wherein
    the elastic member is formed from an electroconductive material and biases a bottom face of the ring-shaped member to hold conduction between the positive material and the bottom face of the positive case.

9. A flat-shaped battery comprising:
    a positive material containing a positive active material;
    a negative material containing a negative active material;
    a separator interposed between the positive material and the negative material,
    a positive case having an opening to house therein the positive material;
    a negative case having an opening to house therein the negative material;
    a gasket for providing a seal between the opening of the positive case and the opening of the negative case; and
    a positive-material fixing member formed of a plate member which is fixed to a bottom face of the positive case to fix the positive material housed in the positive case at a housing position, wherein the positive-material fixing member has a plurality of protruding members formed by folding one end portion of the plate member inward of the positive case, and a plate spring formed by folding the other end portion of the plate member inward of the positive case, and with the protruding members inserted in the positive material, the positive material is biased toward the negative material by the plate spring so that the positive material is fixed at the housing position.

10. The flat-shaped battery as defined in claim 9, wherein in the bottom face of the positive case, a step portion is formed so that a region of the bottom face inner than an edge portion thereof becomes lower than the edge portion, and the positive material is placed in the region inner than the edge portion while the individual protruding members and the plate spring are placed in the region inner than the edge portion.

11. The flat-shaped battery as defined in claim 9, further comprising:

a ring-shaped member which covers a side face and a bottom-face edge portion of the positive material and which is formed from an electroconductive material higher in rigidity than the positive material, wherein the positive-material fixing member is formed from an electroconductive material, and the plate spring biases a bottom face of the ring-shaped member to hold conduction between the positive material and the bottom face of the positive case.

12. A tire pressure detection sensor for use in vehicles, including the flat-shaped battery as defined in claim 9 as a power supply source for the sensor.

\* \* \* \* \*